United States Patent
Malzahn

(10) Patent No.: US 7,201,050 B2
(45) Date of Patent: Apr. 10, 2007

(54) DEVICE FOR DETERMINING THE FILLING LEVEL OF A FILLING MATERIAL IN A CONTAINER

(75) Inventor: Thomas Malzahn, Rheine (DE)

(73) Assignee: Endress + Hauser GmbH + Co., Maulburg (DE)

(*) Notice: Subject to any disclaimer, the term of this patent is extended or adjusted under 35 U.S.C. 154(b) by 0 days.

(21) Appl. No.: 09/901,636

(22) Filed: Jul. 11, 2001

(65) Prior Publication Data
US 2002/0116996 A1   Aug. 29, 2002

(30) Foreign Application Priority Data
Feb. 23, 2001   (DE) ................ 101 08 993

(51) Int. Cl.
*G01F 23/284* (2006.01)
(52) U.S. Cl. ................... 73/290 R
(58) Field of Classification Search .......... 73/290 R; 343/703; 324/634
See application file for complete search history.

(56) References Cited

U.S. PATENT DOCUMENTS

| | | | | |
|---|---|---|---|---|
| 3,691,563 A * | 9/1972 | Shelton | ............. | 333/238 |
| 3,701,158 A * | 10/1972 | Johnson | ............. | 343/725 |
| 4,150,383 A * | 4/1979 | Andersson et al. | ...... | 342/373 |
| 4,263,598 A * | 4/1981 | Bellee et al. | ....... | 343/700 MS |
| 5,406,842 A * | 4/1995 | Locke | ............. | 324/643 |
| 6,019,007 A * | 2/2000 | Grieger et al. | ......... | 73/866.5 |
| 6,124,833 A * | 9/2000 | Bialkowski et al. | ..... | 343/770 |
| 6,266,022 B1 * | 7/2001 | Muller et al. | ........ | 324/644 |
| 6,750,828 B1 | 6/2004 | Wixforth et al. | | |

FOREIGN PATENT DOCUMENTS

| | | |
|---|---|---|
| DE | 37 39 205 A1 | 6/1989 |
| DE | 4014133 C2 | 12/1993 |
| DE | 43 31 353 A1 | 3/1995 |
| DE | 4431886 A1 | 5/1995 |
| DE | 199 29 879 A1 | 1/2001 |
| EP | 0 280 644 | 8/1988 |
| EP | 1083413 A1 | 3/2001 |
| GB | 2 207 556 A | 2/1999 |

OTHER PUBLICATIONS

Heim, Michael: Puls-Radar zur mm-genauen Fullstandmessung, In: tm—Technisches Messen 67, 2000, 5, S. 208-213, Mar. 8, 2000.

\* cited by examiner

*Primary Examiner*—Hezron Williams
*Assistant Examiner*—Paul M. West
(74) *Attorney, Agent, or Firm*—Bacon & Thomas, PLLC

(57) ABSTRACT

The present invention relates to a device for determining the filling level of a filling material in a container, having a signal-generating unit which generates measuring signals, having an input coupling unit and having an antenna. The input coupling unit couples the measuring signals onto the antenna, and the antenna emits the measuring signals in the direction of the surface of the filling material, and has a receiving/evaluating circuit which receives the measuring signals reflected at the surface of the filling material and determines the filing level in the container via the propagation time of the measuring signals. The antenna has at least one first dielectric layer, wherein the side of the dielectric layer not facing from the filling material bears a feed structure, and wherein the side of the dielectric layer facing the filling material has a plurality of cutouts which at least partially have different dimensions and/or shapes.

10 Claims, 4 Drawing Sheets

DEVICE FOR DETERMINING THE FILLING LEVEL OF A FILLING MATERIAL IN A CONTAINER

FIELD OF THE INVENTION

The present invention relates to a device for determining the filling level of a filling material in a container.

BACKGROUND OF THE INVENTION

In addition to horn, rod and parabolic antennas, use is also made of planar antennas in the technology of measuring filling levels. Refinements of planar antennas are described, for example, in the book "Einführung in die Theorie und Technik planarer Mikrowellenantennen in Mikrostreifenleitungs-technik" ["Introduction to the Theory and Technology of Planar Microwave Antennas in Microstrip Line Technology"], by Gregor Gronau, Verlagsbuchhandlung Nellissen-Wolff or in the journal article "Impedance of a radiating slot in the ground plane of a microstrip line", IEEE Trans. Antennas Propagat., Vol. AP-30, 922–926, May 1982.

A planar antenna usually comprises a dielectric substrate on one side of which the antenna structure is provided, and on the other side of which a conductive coating is provided. An asymmetric stripline is the basis of the most widespread planar antenna structure.

Moreover, it is usually possible to provide cutouts in the conductive layer, in which case supply lines to the cutouts are then to be provided on the other side of the dielectric substrate. These cutouts are, for example, configured and arranged in such a way that the antenna preferably radiates only electromagnetic waves of a desired mode. A planar antenna for use in an explosive environment is disclosed in Published European Patent Application No. EP 1 083 413 A1. This known solution can, of course, also be used in combination with the invention described in the present application. This known solution is therefore expressly to be ascribed to the disclosure content of the present application.

Usually (Gaussian) delta-shaped pulses, also frequency-modulated continuous signals are used as measuring signals. Both types of measuring signals are relatively broadband. For example, the pulsed measuring signals have a bandwidth of a few hundred megahertz. The planar antennas which have become known are capable, however, only of radiating the measuring signals in a quasi-punctiform frequency range at the resonant frequency in a virtually undamped fashion. As can be seen from FIG. 2, all frequency components of the measuring signal which are outside the "resonant frequency" of the cutouts are more or less reflected.

SUMMARY OF THE INVENTION

It is the object of the present invention to optimize an antenna in such a way that measuring signals are radiated to the greatest possible extent in a broadband fashion.

This object is achieved by a device which has the following features: a signal generator unit which generates measuring signals, an input coupling unit and an antenna, the input coupling unit coupling the measuring signals onto the antenna, and the antenna emitting the measuring signals in the direction of the surface of the filling material, and a receiving/evaluating circuit which receives the measuring signals reflected at the surface of the filling material and determines the filling level in the container via the propagation time of the measuring signals. The antenna has at least one first dielectric layer, the side of the dielectric layer averted from the filling material bearing a feed structure, and the side of the dielectric layer facing the filling material having a plurality of cutouts which at least partially have different dimensions and/or shapes.

The present invention proceeds from the physical fact that the resonant frequency of the cutouts, that is to say the frequency at which a measuring signal is essentially radiated without being damped, is a function of the respective dimensions of the cutouts. In the case of a rectangular a slot, this means that the resonant frequency is a function of the length and width of the slot.

According to the present invention, the cutouts now have variable dimensions and are, in particular, configured in such a way that the associated resonant frequencies completely cover a desired frequency range. As a result of this, the complete frequency spectrum of a broadband signal can be radiated virtually unhindered in the direction of the filling material.

In accordance with a preferred refinement of the device according to the present invention, it is provided that the cutouts are slot-shaped recesses, wherein the longitudinal axes of the slots are aligned substantially radially.

The radiation characteristic of the antenna can be further improved by the advantageous developments of the device according to the present invention which are named below: thus, it is provided that one group of cutouts or of slots is arranged in an essentially equidistant fashion at a first distance r, from the center of symmetry of the dielectric layer; a second group of cutouts or slots is arranged in an essentially equidistant fashion at a second distance $r_2$ from the center of symmetry of the dielectric layer. The cutouts or the slots of the at least one further group are preferably arranged at a spacing from the cutouts or slots of the first group.

Moreover, it has proved to be advantageous when the cutouts are rectangular slots or recessed, and when the dimensions of the slots vary in the range from 0.8×a to 1.2×a or 0.8×b to 1.2×b; in this case, a characterizes the length and b the width of a slot.

In order to prevent deposits from forming on the side of the dielectric layer facing the filling material, in accordance with an advantageous development of the device according to the present invention a dielectric protective layer is provided which is connected to the dielectric layer on the side on which the cutouts or the slots are arranged.

Both the (feed structure) antenna structure and the cutouts are preferably applied to the dielectric layer using an etching process. For example, both sides of the dielectric layer bear a copper coating. One side of the dielectric layer is now treated such that the desired feed structure remains on it; cutouts with the desired dimensions are etched out on the second side. The correct position of the feed structure relative to the cutouts is ensured via register marks.

The planar antenna preferably has a circular cross section. It can then be mounted with relative ease in the stub of a container, which usually likewise has a circular cross section. Consequently, the first dielectric layer and/or the at least one further dielectric layer is/are preferably a circular disk or circular disks.

As already mentioned at a preceding juncture, the antenna is preferably suitable for radiating relatively broadband measuring signals.

The antenna structure and the cutouts or the slots preferably cooperate such that the antenna essentially emits mea suring signals of a selected mode. In the radiation of monomode measuring signals, virtually no dispersion at all occurs in the case of guided radiation of the measuring signals. The echo signals, which reflect the fraction of the measuring signals which is reflected at the surface of the filling material, are then characterized by a defined peak, which is to be assigned with high accuracy to the corresponding filing level.

BRIEF DESCRIPTION OF THE DRAWINGS

The invention is explained in more detail with the aid of the following drawings, in which.

DETAILED DESCRIPTION

Figure 1:
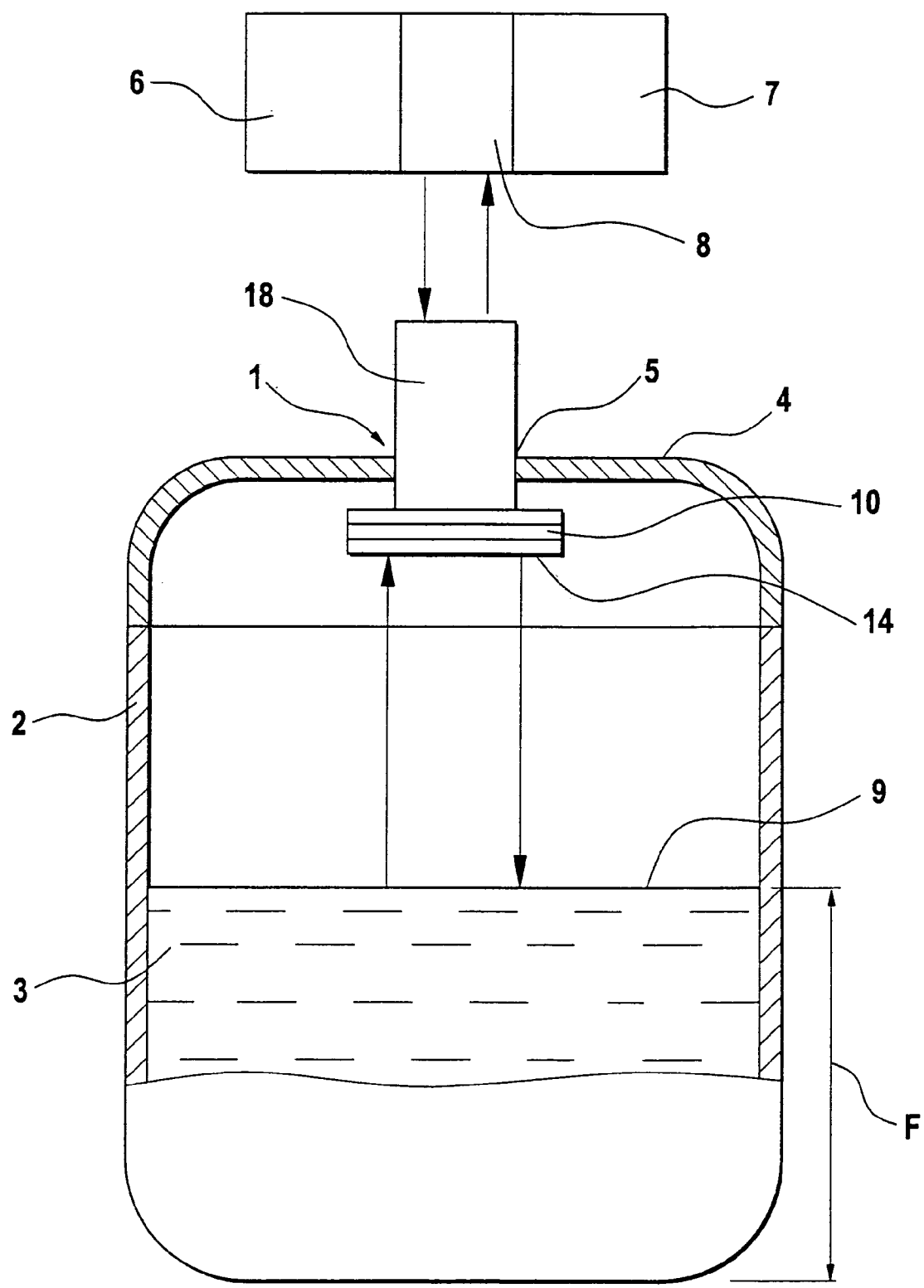
FIG. 1 shows a schematic of the device according to the present invention.

FIG. 1 shows a schematic of the device according to the present invention. An antenna 1 for determining the filling level F of a filling material 3, which is located in a container 2, is mounted in an opening 5 in a lid 4 of the container 2. The antenna 1 is arranged in the opening 5 such that the measuring signals, which are generated in a signal-generating unit 6, strike a surface 9 of the filling material 3 essentially perpendicularly. The measuring signals reflected at the surface 9 are received by the antenna 1 and relayed from there to a receiving/evaluating circuit 7. The receiving/evaluating circuit 7 uses the propagation time for the measuring signals to determine the filling level F of the filling material 3 in the container 2. The principle of the design of a corresponding microwave measuring instrument is known from the prior art. Corresponding instruments are marketed and sold by the applicant's assignee under the designation of Micropilot.

Figure 2:
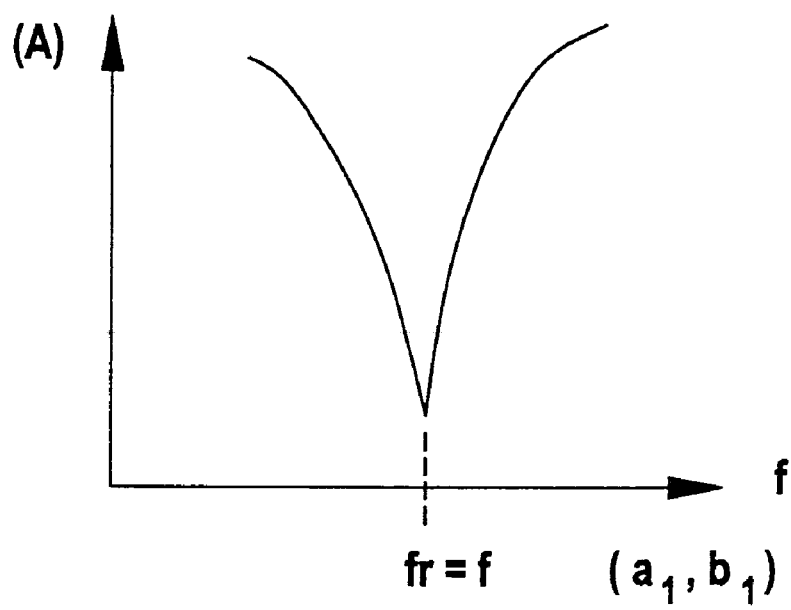
FIG. 2 shows graphs of the return loss of a planar antenna as a function of the frequency in the case of cutouts of equal dimensions (prior art)

FIG. 2 relates to the return loss of a known planar antenna. Reference is made, in turn, in this context to the already cited EP 1 083 413 A1. As may easily be seen from the resonance curve, the amplitude A reaches a minimum at the resonant frequency $f_r$—the reflection of the measuring signal is therefore minimal here. More or less strong reflections occur in the case of all the remaining frequencies, and this means that the corresponding frequency components experience a reflection. Of course, this has an extremely disadvantageous effect in the case of broadband measuring signals, since only a fraction of the frequency spectrum can still be radiated at all, and thus can reach the surface 9 of the filling material 3.

Figure 3:
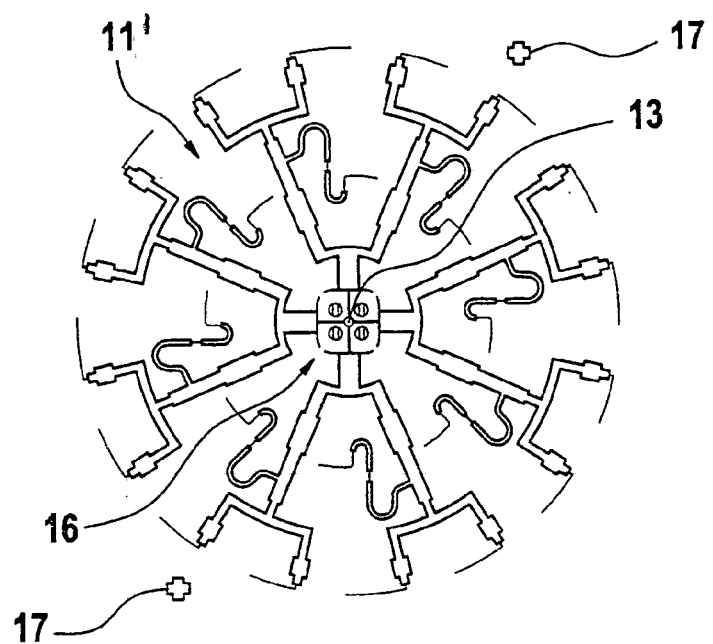
FIG. 3 shows a plan view of the feed structure in accordance with a preferred embodiment of the device according to the present invention.

FIG. 3 shows the feed structure 11' which is used in accordance with a preferred embodiment of the device according to the present invention. The feed structure 11' is of highly symmetric design. A contact 16 for connecting to an input coupling unit 18 is provided in the region of the center of symmetry 13. Greater detail on this can be found in EP 1 083 413 A1, which has already been cited.

Figure 4:
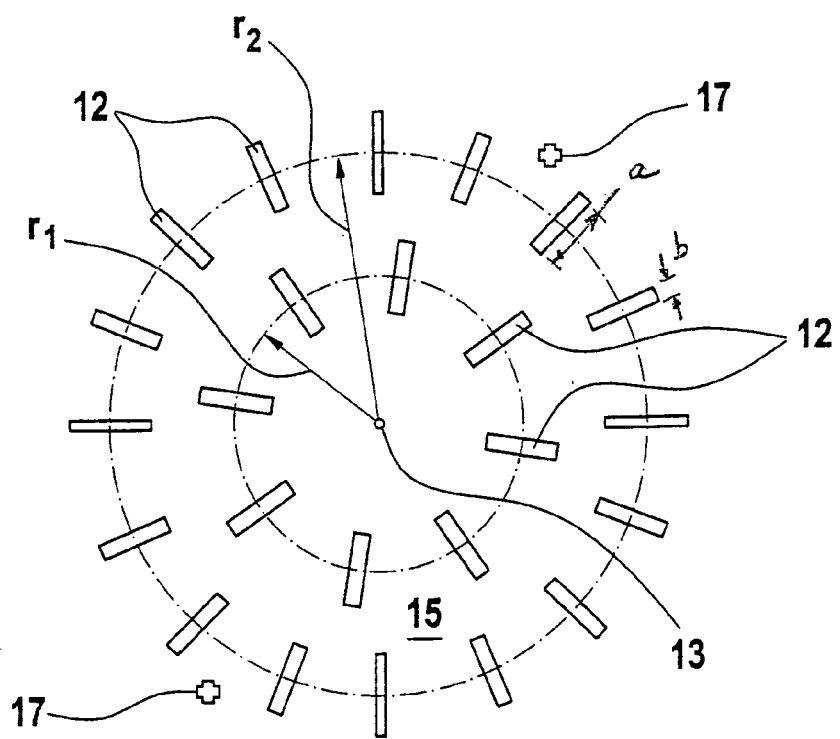
FIG. 4 shows a plan view of the cutouts in accordance with a preferred embodiment of the device according to the present invention.

The arrangement and the various dimensions of cutouts 12 are illustrated in FIG. 4. The cutouts 12, which were preferably etched out of a conductive layer 15, do not have uniform dimensions but differ from one another with regard to their width b and length a. In the case shown, the cutouts 12 are arranged in two groups, a first group has a distance $r_1$ from the center of symmetry 13, while the second group of cutouts has a distance $r_2$ from the center of symmetry 13.

Figure 5:
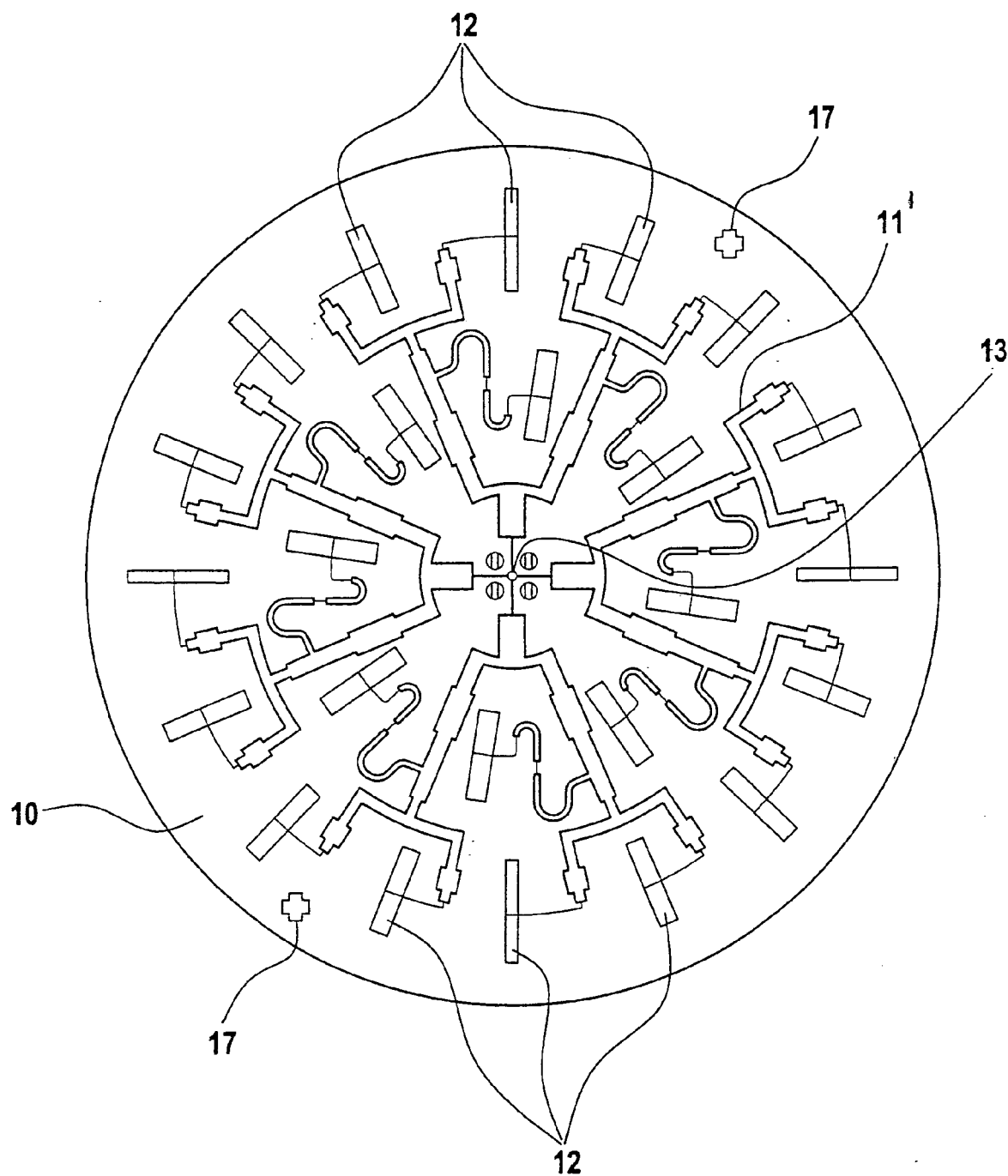
FIG. 5 shows an illustration of the dielectric layer which bears the structures shown in FIG. 3 and FIG. 4.

FIG. 5 shows an illustration of a dielectric layer 10 in accordance with a preferred refinement of the device according to the present invention. The feed structure 11' is applied to the side of the dielectric layer 10 which is averted from, or does not face the filing material 3; the cutouts 12 are provided on the side of the dielectric layer 10 which faces the filling material 3. The correct position of the feed structure 11' relative to the cutouts 12 is ensured by the register marks 17, which are provided on both sides of the dielectric layer 10.

Figure 6:
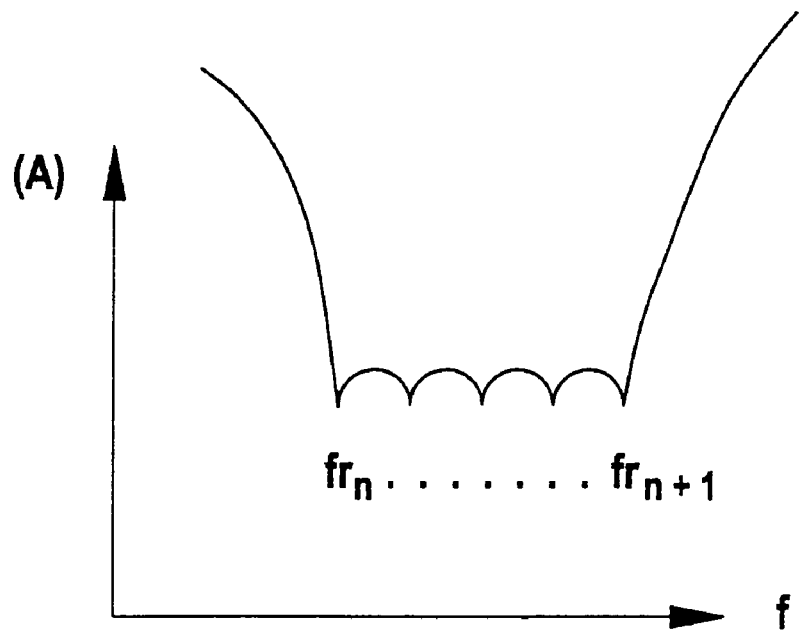
FIG. 6 shows a graph which illustrates the return loss of a measuring signal as a function of the frequency in the case of the planar antenna according to the present invention.

Shown schematically in FIG. 6 is the graph which represents the absolute value of the return loss of the planar antenna as a function of the frequency f in accordance with the solution according to the present invention. Because of the dependence of the resonant frequency $f_r$ on the dimensions of the cutouts 12, in other words, here, on the length a and the width b of the slots, a multiplicity n of resonant frequencies $f_n$ occur which lie relatively close together. In summary, it is therefore possible to generate a frequency band in which the measuring signals are radiated virtually without loss via the antenna 1 according to the present invention.

What is claimed is:

1. A device for determining the filling level of a filling material in a container, the material defining a surface in the container, comprising;

a signal-generating unit for generating measuring signals;

an input coupling unit adapted to receive the generated measuring signals;

an antenna connected to said input coupling unit and having at least one first dielectric layer containing a feed structure on the side thereof facing away from the filling material, a conductive layer on the side thereof facing the filling material, and a plurality of cutouts in said conductive layer, with a number of said plurality of cutouts having different lengths, widths and shapes; and a receiving/evaluating circuit adapted to receive the generated measuring signals subsequent to being reflected from the surface defined by the filling material, wherein:

said input coupling unit coupling the generated measuring signals onto the antenna, said antenna then emitting measuring signals in the direction of the surface defined by the filling material, in assembly with the container, said at least one dielectric layer is arranged so that said plurality of cutouts face the surface defined by the filling material and said feed structure face away from the surface defined by the filling material, the measured signals received by the receiving/evaluating circuit are used by said receiving/evaluating circuit to determine the filling level in the container of the filling material via the propagating time of the measure signals, and said cutouts are configured as rectangular slots the dimensions of which vary in the range from 0.8×a to 1.2×a or 0.8×b to 1.2×b, where a is the length and b is the width of a slot.

2. The device as defined in claim 1, wherein said cutouts form slot-shaped recesses, and wherein each cutout defines a longitudinal axis which is aligned substantially radially.

3. The device as defined in claim 1, wherein said dielectric layer defines a center with one group of said cutouts arranged at approximately a first radius from the center of said dielectric layer, and at least one further group of said cutouts arranged at approximately a second radius from the center of said dielectric layer.

4. The device as defined in claim 3, wherein said cutouts of said at least one further group of said cutouts are spaced from said cutouts of said first group.

5. The device as defined in claim 1, further comprising: a dielectric protective layer connected to said at least one dielectric layer on the side containing said cutouts.

6. The device as defined in claim 5, wherein said cutouts and said feed structure are applied to said at least one dielectric layer by etching.

7. The device as defined in claim 5, wherein at least one of said at least one dielectric layer and said dielectric protective layer comprise a circular disk.

8. The device as defined in claim 1, wherein the measuring signals comprise broadband measuring signals.

9. The device as defined in claim 1, wherein said antenna and its cutouts cooperate such that said antenna essentially emits measuring signals of a selected mode.

10. The device as defined in claim 1, wherein the lengths, widths and shape of said cutouts are defined in the planar direction of said first dielectric layer.

* * * * *